United States Patent Office 3,008,906
Patented Nov. 14, 1961

3,008,906
VULCANIZED RUBBER RECLAIMING COMPOSITION OF SULFURIZED TALL OIL AND NAPHTHENIC BASE PETROLEUM OIL
Bernard H. Nicolaisen, Tonawanda, N.Y., assignor to Olin Mathieson Chemical Corporation, a corporation of Virginia
No Drawing. Filed Oct. 22, 1958, Ser. No. 768,828
9 Claims. (Cl. 260—2.3)

This invention relates to a novel composition useful in the reclaiming of vulcanized rubber and the process of making it.

Several processes are widely known for reclaiming vulcanized rubber. In the alkali reclaiming process, which is particularly suitable for reclaiming vulcanized natural rubber, the scrap is digested under pressure for a considerable time with caustic alkali. In the neutral process, the scrap is digested with zinc chloride or calcium chloride solution. The acid process comprises digestion with 15 to 25 percent by weight sulfuric acid for several hours. However, difficulties are encountered in all of these processes in obtaining reclaimed scrap having the desired properties.

The addition of tall oil in the alkali, neutral or acid processes has previously been known to produce improved results, particularly with respect to tackiness and acceleration of the cure during subsequent vulcanization. Crude tall oil is a by-product of the paper pulp industry and consists of about 50 percent by weight resin acids, e.g., abietic acid; 40 percent by weight fatty acids, e.g., oleic and linoleic acids; and about 10 percent by weight unsaponifiable material, e.g., sterols and high molecular weight aliphatic alcohols. However, on standing, crude tall oil forms a semi-solid non-homogeneous mass and separates into a relatively fluid upper layer and a solid or semi-solid lower layer. This behavior of crude tall oil is a serious disadvantage in its use in reclaiming rubber, since, in order to obtain its desirable effects, such separated tall oil must be homogenized in some way before introducing it into the reclaiming process.

In order to overcome the defects inherent in crude tall oil and to make it more readily utilized in the reclaiming of either natural or synthetic vulcanized rubber, various expedients have been suggested. The tall oil has been diluted with various petroleum oils in an effort to overcome the tendency to crystallize on standing. Most petroleum oils, however, are poor solvents for the crystallizable constituents of the crude tall oil and do not provide a satisfactory solution to the problem. Tall oil has also been over-neutralized or partially neutralized with alkalies or with organic amines in an effort to overcome the crystallization problems and effect some improvement. However, the resin acids, particularly the abietic acids, present in the tall oil function most effectively in the rubber reclaiming process and interfere least with the subsequent vulcanization of the rubber when they are present as free acids.

It has now been found that, if tall oil is lightly sulfurized under controlled conditions and if the sulfurized tall oil concentrate is diluted with a suitable petroleum oil, the resulting composition retains all the properties of the tall oil and its free resin acids which are desirable with respect to natural or synthetic vulcanized rubber reclaiming processes and, further, does not crystallize on long storage at low temperatures.

The process of the present invention includes heating tall oil with about 1 to 5 percent of its weight of sulfur in the absence or presence of a catalyst at a temperature of about 100° C. to 150° C. for about 6 to 30 hours and diluting the resultant sulfurized tall oil concentrate with a naphthenic base oil having a viscosity in the lubricating oil range of viscosities.

The tall oil employed in the present process can be crude, partly refined or a mixture of the two. As regards the sulfur, the proportion employed in the heating step is about 1 to 5 percent by weight of the tall oil. When the proportion of sulfur is reduced below about 1 percent by weight, the product of the heating step is insufficiently treated and may crystallize on storage, rendering it unsuitable for use in the processes of rubber reclamation. On the other hand, use of more than about 5 percent by weight of sulfur necessitates the use of higher temperatures of heating for longer periods of time in order to combine all of the sulfur with the tall oil. Under these conditions, the viscosity of the sulfurized tall oil concentrate can become too high, i.e., too much above about 700 centistokes at 100° F., to be satisfactory.

Catalysts which are useful in the heating step of the process of the invention are metallic salts of organic acids, e.g., fatty acids, such as the naphthenates of cobalt, copper, manganese or zinc, and polyethylene polyamines, such as triethylene tetramine and tetraethylene pentamine. These compounds appear to catalyze the viscosity increase in the sulfurized tall oil concentrate and this viscosity rise appears to be one of the indicia of the stability against crystallization in the naphthenic base oil-diluted compositions of the present invention.

As noted, the process of the present invention involves a heating step of from about 6 to 30 hours duration. Preferably, the heating will be carried on for from about 8 to 15 hours.

The sulfurization step of the present process raises the viscosity of the tall oil. Suitably, the viscosity level of the sulfurized tall oil concentrate is from about 350 to 700 centistokes at 100° F. When the viscosity is below about 350 centistokes at 100° F., the sulfurized oil is insufficiently treated and some components may crystallize from the diluted composition on storage. Viscosities above 700 centistokes at 100° F. are unsatisfactory since the diluted composition will be difficult to use in the reclaiming process. Viscosities of 500 to 640 centistokes at 100° F. are preferred, since dilution of the concentrate with the naphthenic base oil at such a point produces a reclaiming oil of suitable viscosity, e.g., about 250 to 600 centistokes at 100° F. A viscosity of about 350 centistokes at 100° F. is preferred. The acid value of the tall oil is slightly reduced by sulfurization. The acid value of the sulfurized tall oil concentrate should be about 150 to 160, preferably 155, before dilution with the naphthenic base oil.

The dilution step of the present process is carried out so as to achieve compositions containing from about 80 to 95 percent by weight of the sulfurized tall oil concentrate and the remainder naphthenic base oil of lubricating viscosity. A preferred naphthenic base oil diluent has the following characteristics:

| | |
|---|---|
| Viscosity at 100° F. SUV | 60 to 100 |
| Flash point, ° F., min. (C.O.C.) | 275 |
| Fire point, ° F., min. (C.O.C.) | 300 |
| Pour point, ° F., max | −20 |
| Neutralization number, max | 0.20 |

The compositions of the present invention are homogeneous liquids which do not crystallize or separate on long storage at low temperatures. They are, primarily, liquid rosin and they contain the rosin acids in the form most advantageous with respect to vulcanized rubber reclamation processes, especially the alkali and acid processes. They have a desirable accelerating effect on the reactions taking place in such processes and they imbue the reclaimed rubber with improved properties of plasticity and absence of tackiness. Preferably, they are added to digester charges in proportions of 125 pounds of the composition for 10,000 pounds of scrap rubber. This proportion can be varied over a range of about 0.5 to 2.5 percent by weight to give a suitable plasticity without over-softening the rubber.

For a better understanding of the present invention, reference should be had to the following examples:

Example I

A mixture of 97 parts by weight of tall oil and 3 parts by weight of sulfur was heated at 120° C. to 130° C. for 12 hours. The clear sulfurized product had a viscosity of 656 centistokes at 100° F. and an acid value of 157. Dilution of 85 parts of the sulfurized tall oil with 15 parts of naphthenic oil yielded a composition for use in the reclamation of vulcanized rubber. The characteristics of the diluent oil were as follows:

| | |
|---|---|
| Viscosity at 100° F., SUV | 78 |
| Flash point, ° F. (C.O.C.) | 310 |
| Fire point, ° F. (C.O.C.) | 345 |
| Specific gravity at 20° F | 0.896 |
| Boiling point, ° F | Ca. 600 |

Example II

A mixture of 96 parts by weight of tall oil and 4 parts by weight of sulfur was heated at 120° C. to 130° C. for 11.5 hours. The clear product had a viscosity of 642 centistokes at 100° F. Dilution of 90 parts of the sulfurized tall oil with 10 parts of the naphthenic oil described in Example I yielded a composition suitable for use in the reclaiming process.

Example III

A mixture of 95 parts by weight crude tall oil, 5 parts by weight of sulfur and 0.1 part of zinc naphthenate to act as catalyst was heated for 10 hours at 128° C. to 129° C. The viscosity of the mixture after 10 hours heating was 672 centistokes at 100° F. The catalyzed sample had sufficient viscosity that, on dilution with the naphthenic base oil of Example I, in the proportion of 90 parts of sulfurized tall oil to 10 parts of naphthenic oil, the mixture was stable on storage for an indefinite period without crystallization. The diluted mixture was suitable for use in reclaiming vulcanized rubber.

Example IV

Two mixtures each containing 97 parts by weight of crude tall oil and 3 parts by weight of sulfur were heated at 128° C. to 129° C. for 6 hours. Tetraethylene pentamine (0.5 percent by weight) was added to one of the mixtures before the heating. At the end of the heating period, the uncatalyzed sample had a viscosity of 392 centistokes at 100° F., while the catalyzed sample had a viscosity of 658 centistokes at 100° F. The catalyzed sulfurization product, when diluted in the proportion of 90 parts of tall oil and 10 parts of the naphthenic oil of Example I, was suitable for use in the rubber reclaiming process.

Example V

A steam-jacketed kettle was charged with 10,000 pounds of finely ground GR-S rubber scrap free from fabric, 20 pounds of the composition of Example IV and 500 pounds of solvent naphtha. The mixture was digested for 8 hours at about 370° F. to 380° F. under 175 p.s.i., washed and dried.

Example VI 33.3 pounds of crude tall oil was heated, with stirring, to about 100° C. and 230 grams of powdered sulfur was added over a five minute interval. The temperature of the mixture was maintained at 115° C. to 135° C. for about 28 hours. The viscosity after the heating period was 451 centistokes at 100° F. About 3.75 pounds of the naphthenic oil of Example I was stirred homogeneously into the sulfurized tall oil to give a product having a viscosity of 294 centistokes at 100° F. A portion of the solution so prepared was stored for 4 months at temperatures of 50° F. to 70° F. After this period, it was still a clear, crystal-free liquid suitable for use in rubber reclaiming.

Example VII

These compositions were made up containing the following components. The numbers indicate parts by weight:

| | A | B | C |
|---|---|---|---|
| Crude tall oil | 90 | 88.65 | 88 |
| Sulfur | 0 | 1.35 | 2 |
| Diluent oil | 10 | 10.00 | 10 |

In making up these compositions, the tall oil was heated, with stirring, to about 100° C. and the sulfur was stirred into the heated tall oil over a five minute period. The temperature of the mixture was maintained at 115° C. to 135° C. for about 28 hours. The diluent oil employed was the same as is described in Example I. The viscosities in centistokes at 100° F. of the sulfurized tall oil and the diluted final product were:

| | A | B | C |
|---|---|---|---|
| Sulfurized tall oil | 300 | 384 | 550 |
| Diluted final product | 210 | 270 | 301 |

Half of each of the product samples were stored in glass bottles and half in tin-lined cans. The temperature during storage was caried every few days between 32° F. and 105° F. During this time, the samples were periodically rotated to disturb the contents. After 2 months, only sample A showed any precipitate. After 4 months, sample A contained about 25 percent sludge, while samples B and C were uniform liquids suitable for use in rubber reclaiming.

Example VIII

Sulfur was slowly stirred into crude tall oil, heated to 130° C. to 135° C., to the extend of 1.35 percent by weight. The solution was maintained at this temperature for 24 hours after the sulfur was added. After dilution with 10 parts by weight of the naphthenic oil of Example I to 90 parts of the sulfurized tall oil, the viscosity of the final product was 360 centistokes at 100° F. It remained a clear liquid suitable for rubber reclaiming after being stored for over 4 months at room temperature.

Example IX

Another batch of crude tall oil was treated with 1.35 weight percent sulfur and the solution was heated for 20 hours at about 130° C. The viscosity of the sulfurized tall oil was 587 centistokes at 100° F. The viscosity of the final product, which contained 90 parts by weight of the sulfurized tall oil to 10 parts by weight of the naphthenic oil of Example I was 397 centistokes at 100° F. A sample of this product was stored in a tinned can at 32° F. for one month, at 100° F. for 5 days and then at room temperature for 4 months. There was no sign of crystallization after this treatment and the product was still useful in rubber reclamation.

What is claimed is:

1. A composition of matter useful in the reclamation of vulcanized rubber consisting essentially of from about 80 to 95 percent by weight based on the total composition of a sulfurized tall oil concentrate having a viscosity of from about 350 to 700 centistokes at 100° F. and an acid value of from about 150 to 160 and a diluent remainder of naphthenic base petroleum oil having a viscosity in the lubricating oil range of viscosities, the composition having a viscosity of from about 250 to 600 centistokes at 100° F.

2. The composition of claim 1 in which the viscosity is about 350 centistokes at 100° F.

3. The composition of claim 1 in which the viscosity of the concentrate is from about 500 to 640 centistokes at 100° F.

4. The composition of claim 1 in which the acid value of the concentrate is about 155.

5. The composition of claim 1 in which the sulfurized tall oil concentrate is produced by heating tall oil and sulfur, the sulfur being from about 1 to 5 percent by weight of the tall oil, to about 100° C. to 150° C. for from about 6 to 30 hours.

6. The composition of claim 5 in which the heating is carried out in the presence of a catalyst promoting sulfurization and viscosity increase.

7. The method of making a composition of matter useful in the reclamation of vulcanized rubber comprising heating tall oil and sulfur to a temperature of about 100° C. to 150° C., the sulfur being from about 1 to 5 percent by weight of the tall oil, to produce a sulfurized tall oil concentrate having a viscosity of from about 350 to 700 centistokes at 100° F. and an acid value of from about 150 to 160 and diluting the concentrate with a naphthenic base petroleum oil having a viscosity in the lubricating oil range of viscosities to produce a composition having a viscosity of from about 250 to 600 centistokes at 100° F. useful in the reclamation of vulcanized rubber, the concentrate being from about 80 to 95 percent by weight of the composition.

8. The method of claim 7 in which the heating is to about 100° C. to 150° C. for from about 6 to 30 hours.

9. In the reclamation of vulcanized rubber, the improvement comprising adding the composition of claim 1 to the vulcanized rubber being reclaimed in an amount of about 0.5 to 2.5 percent by weight of the said vulcanized rubber.

References Cited in the file of this patent

UNITED STATES PATENTS

| | | |
|---|---|---|
| 2,714,071 | Van Valkenburgh | July 26, 1955 |
| 2,736,662 | Van Valkenburgh | Feb. 28, 1956 |